United States Patent [19]

Eriksson

[11] Patent Number: 4,511,836
[45] Date of Patent: Apr. 16, 1985

[54] CIRCUIT ARRANGEMENT FOR POWER CONTROL

[76] Inventor: Bror A. Eriksson, Box 10022, Karlstad, Sweden

[21] Appl. No.: 511,163
[22] PCT Filed: Oct. 26, 1982
[86] PCT No.: PCT/SE82/00353
§ 371 Date: Jun. 9, 1983
§ 102(e) Date: Jun. 9, 1983
[87] PCT Pub. No.: WO83/01694
PCT Pub. Date: May 11, 1983

[51] Int. Cl.³ .............................................. G05F 5/00
[52] U.S. Cl. .................................... 323/300; 323/243; 323/246
[58] Field of Search ............... 323/299, 300, 304, 246, 323/243

[56] References Cited

FOREIGN PATENT DOCUMENTS 2414851 10/1975 Fed. Rep. of Germany .
2646479 4/1978 Fed. Rep. of Germany .
54-44462 4/1979 Japan .
551715 7/1974 Switzerland .

OTHER PUBLICATIONS

Patent Abstracts of Japan, Abstract of JP 54-44462, Published 1979-07-04.

Primary Examiner—Peter S. Wong
Assistant Examiner—Judson H. Jones
Attorney, Agent, or Firm—Cushman, Darby & Cushman

[57] ABSTRACT

Figure 1:
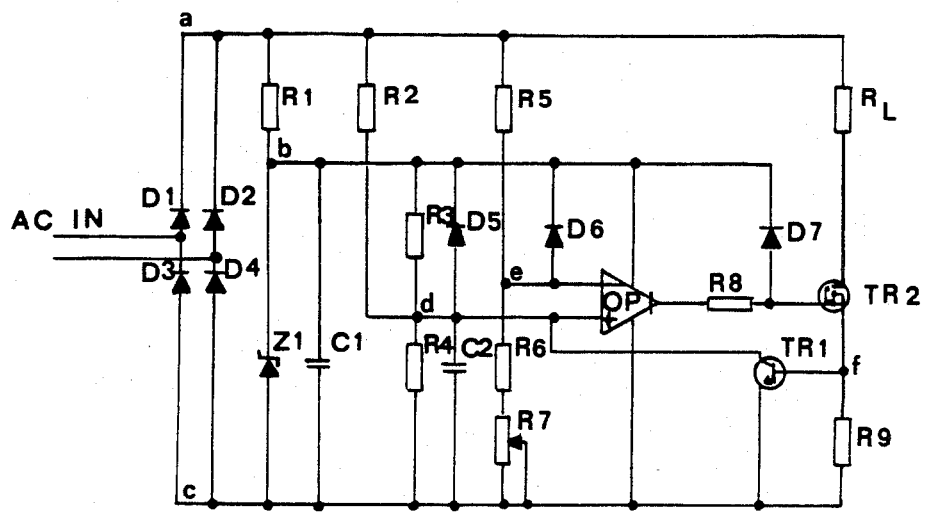

The power drawn by a load ($R_L$) from an A.C. network is controlled by an operational amplifier (OP1) and a power transistor (TR2). The operational amplifier makes the transistor leading when the voltage of its inverting input which is derived from said network, is lower than a reference voltage supplied to its non-inverting input. The pulses through the load take a form corresponding to the first and last parts of a sinusoidal half-wave. Their time lengths are shortened according as the voltage of the feeding network increases, and vice versa. FIG. 1.

4 Claims, 2 Drawing Figures

U.S. Patent   Apr. 16, 1985   4,511,836

CIRCUIT ARRANGEMENT FOR POWER CONTROL

The invention relates to a circuit arrangement for maintaining the power drawn by a load from an alternating current source at a value to a high degree independent of the voltage of said source.

Circuit arrangements for said purpose are known, in which a D.C. voltage derived from an A.C. network by rectification is periodically interrupted so as to form square-shaped pulses, the length of which is shortened according as their amplitude increases, the pulse length being controlled by an operational amplifier comparing the fluctuating voltage of the network with a fixed reference voltage.

On account of the complicated and non-linear relationship between the load output and said voltage, it is possible to maintain the output fairly constant merely within a comparatively narrow range of voltages.

The object of the invention is to create a circuit arrangement which, with the use of a small number of components, provides such a compensation of voltage variations of the current source that the power drawn by the load is maintained constant with very small and acceptable deviations, when the voltage of the power source varies between values of the ratio 1:2 or within a still greater range.

The invention is based upon the experience that said power control is easier to realize if the load is fed with pulses formed by those parts of the sine curve of the voltage of the power source that lie next to zero voltage, whereby due consideration can be taken to the fact that when varying the voltage of the power source the energy contents of the pulses vary with the first power of their lengths and with the second power of their amplitudes.

Figure 2:
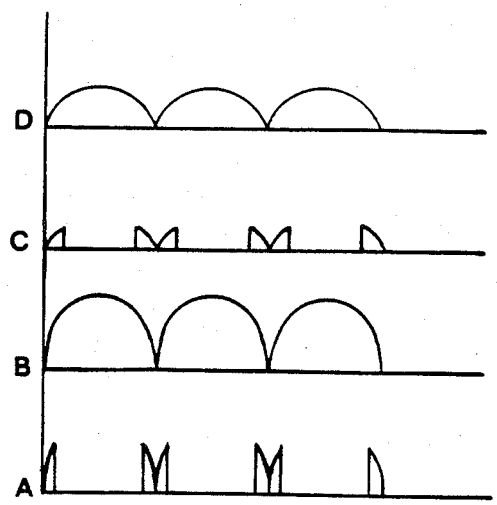

The characterizing features of the invention are set forth in the following claims, and the details of an exemplary embodiment of the circuit are described herein below with reference to the accompanying drawing, in which FIG. 1 is a circuit diagram and FIG. 2 shows curve shapes of feeding voltages and output pulses.

The lines AC IN of the circuit are connected to a power source which is assumed to be a distribution network of 110 V and 50 Hz. By means of the diodes D1, D2, D3 and D4 the power supply is rectified, so that between the lines a and c (which may be grounded) there is a potential difference of the curve shape shown in FIG. 2 D, and consisting of consecutive sinusoidal half-waves of the same positive polarity. A zener diode Z1 shunted by a condenser C1 is in series with a resistor R1 connected between the lines a and c and holds the point or line b at a constant, comparative low D.C. voltage (e.g. of the order of 10 V). An operational amplifier OP1 (e.g. of the type RCA 3140) is fed from the line b.

A resistor R3 (e.g. 100 kohm) in series with a resistor R4 (e.g. 47 kohm) is connected between the lines b and c. At the point or line d a voltage of constant value of the order of 3 V is maintained and is supplied to the non-inverting input (+) of the operational amplifier OP1 as a reference voltage.

The inverting input of OP1 is connected to the intermediate point e upon a voltage divider consisting of a series connection of a fixed resistor R3 (330 kohm), a fixed resistor R6 (18 kohm) and an adjustable resistor R7 (50 kohm). In the point e there appears a voltage of the same fully rectified sinusoidal shape (FIG. 2D) as in line a but of a considerably reduced magnitude (about a tenth thereof).

The operational amplifier OP1 is connected via a resistor R8 (47 kohm) to a power transistor TR2 (e.g. of the type Siemens BUZ 45) and triggers the same. The output terminals of said transistor are in series with the resistor R9 (0.1 ohm) and the load $R_L$ connected between the lines a and c. The load is resistive and may consist of a halogen incandescent lamp rated 20 W and 24 v. The transistor TR2 shuts the load $R_L$ on and off momentarily at intervals determined by the operational amplifier.

The circuit so far described operates in the following manner: As long as the voltage of point e supplied to the inverting input of the operational amplifier is less than the constant voltage supplied via point d as a reference voltage to the non-inverting input of the operational amplifier, the output thereof supplies a voltage to the transistor TR2 making the same leading. When the voltage upon the inverting input of OP1 grows to be the greater and as long as it remains greater than the voltage upon the non-inverting input of the operational amplifier, the transistor TR2 is choked and no current flows through the load $R_L$. Therefore, the load will be fed by mainly triangular pulses of the shape shown in FIG. 2 C and consisting of the starting and ending portions of each sinusoidal half-wave of the voltage of the rectified powersupply. If said voltage rises, as when connecting the lines AC In to a distribution network of 220 V, the voltage at e and upon the inverting input of the operational amplifier will rise from zero value quicker than before to the same value as the voltage upon the non-inverting input, so that the operational amplifier reaches its cut-off point earlier and the lengths of the pulses are shortened. The pulses will take the shape of FIG. 2 A, being not only shorter but also higher than in FIG. 2 C, due to the raised voltage of the power supply (FIG. 2 B). Thus the length of the pulses is varied in order to counteract the variations of the load output due to changing voltages of the power source. The circuit so far described will do as long as the voltage of the power source varies within narrow limits, but e.g. for a doubling thereof the time length of the pulses will become too short and needs correction. According to a secondary feature of the invention such a correction is provided which consists in applying upon the non-inverting input of the operational amplifier a superposed, comparatively low, smoothed portion of the voltage of the fully rectified power supply. This is accomplished by the added components R2 and C2. R2 is a resistor (e.g. 2.2 Mohm) connected between the lines a and d, and C2 is a condensor (0,47 μF) connected across the resistor R4. The fluctuating current flowing through R2 and R4 is smoothed by the condensor C2 and raises the potential difference across R4, C2. Thus the voltage supplied by the line d to the non-inverting input of the operational amplifier is composed of the above-mentioned constant component determined by the zener diode Z1 and a superposed variable component determined by the A.C. voltage of the feeding network. Said component adjusts the reference voltage level on OP1 and the time lengths of the cut-off parts of the sine curve admitted through the load are changed in such a manner that the energy contents of the pulses vary only very slightly with the changed A.C. voltage.

For instance, when said voltage is doubled, the pulse lengths are shortened to about 60–65 percent.

D5, D6 and D7 are clamping diodes. TR1 is a transistor (e.g. of the type BC 107) serving for the protection of the lamp $R_1$ against overload due to possible unforeseen incidents. Said transistor is not essential to the invention and may be omitted.

Primarily the invention aims at maintaining the power of the load at a fixed value, e.g. a value at which for instance an incandescent lamp gives off full light intensity. However, by adjusting the resistor R7 it is also possible to maintain the power output constant at a higher or lower value, e.g. for dimming the lamp.

The voltage of the power source may be raised from the above-assumed value of 110 V to 220 V or it may be lowered to a voltage merely slightly above the rated value of the load, without damage and with a very small variation of the power output. Thus the circuit may be connected to any common distribution network and it is not even necessary to take notice of its voltage.

The types and values of the components mentioned above are given only for illustrative purposes and do not involve any restriction of the scope of the invention. The following claims cover modifications in various respects.

I claim:

1. Circuitry for maintaining constant the effect drawn by a load from an A.C. power source essentially independent of its voltage, comprising:

an operational amplifier having first and second inputs;

a power transistor in series with the load from the A.C. power source;

a feeding line carrying a feeding voltage of a sinusoidal, wave form;

means for applying a fraction of the voltage of the A.C. power source to the first input of the operational amplifier;

means for applying a reference voltage to the second input of the operational amplifier so that the reference voltage is raised and lowered when the feeding voltage is raised and lowered; and wherein the operational amplifier is connected to the power transistor to control the power transistor, so that the transistor is made leading when and as long as the instantaneous value of said fraction of the feeding voltage is lower than a limiting value determined by said reference voltage; and so that the load is passed by periodic pulses of a curved form corresponding to that of the first and last parts of a sine half-wave next to the zero value and of a length which is greater or smaller depending upon whether said feeding voltage is lower or higher, respectively; and so that the energy contents of the pulses are maintained essentially constant over a wide range of feeding voltage variations.

2. Circuitry as recited in claim 1 wherein the operational amplifier and power transistor are operatively interconnected so that the length of the pulses is shortened at a lower rate than in inverted proportion to the rise of the feeding voltage, and vice-versa.

3. Circuitry as recited in claim 1 wherein said means for applying a reference voltage applies a reference voltage that is composed of a first component maintained at a constant value by a Zener diode, and a second component consisting of a smoothed fraction of the feeding voltage.

4. Circuitry as recited in claim 1 wherein said first input is an inverting input, and wherein said means for applying a voltage thereto comprises means for supplying an unsmoothed voltage forming a fixed fraction of the feeding voltage; and wherein said second input of said operational amplifier comprises a non-inverting input, and wherein said means for applying a voltage to said second input comprises means for supplying a constant voltage superimposed by a smoothing fraction of the feeding voltage.

* * * * *